United States Patent
Schikorra

(10) Patent No.: US 10,396,692 B2
(45) Date of Patent: Aug. 27, 2019

(54) METHOD FOR OPERATING A BRUSHLESS DIRECT CURRENT MOTOR

(71) Applicants: EONAS IT-BERATUNG UND -ENTWICKLUNG GMBH, Berlin (DE); BROSE FAHRZEUGTEILE GMBH & CO. KOMMANDITGESELLSCHAFT, WÜRZBURG, Würzburg (DE)

(72) Inventor: Daniel Schikorra, Berlin (DE)

(73) Assignee: Brose Fahrzeugteile GmbH & Co. Kommanditgesellschaft, Wurzburg (DE)

( * ) Notice: Subject to any disclaimer, the term of this patent is extended or adjusted under 35 U.S.C. 154(b) by 0 days.

(21) Appl. No.: 15/544,237

(22) PCT Filed: Feb. 10, 2016

(86) PCT No.: PCT/EP2016/052833
§ 371 (c)(1),
(2) Date: Aug. 4, 2017

(87) PCT Pub. No.: WO2016/128468
PCT Pub. Date: Aug. 18, 2016

(65) Prior Publication Data
US 2017/0359007 A1  Dec. 14, 2017

(30) Foreign Application Priority Data

Feb. 10, 2015  (DE) .................. 10 2015 101 898

(51) Int. Cl.
*H02P 6/18*  (2016.01)
*H02P 6/182*  (2016.01)

(52) U.S. Cl.
CPC .............. *H02P 6/183* (2013.01); *H02P 6/181* (2013.01); *H02P 6/182* (2013.01)

(58) Field of Classification Search
USPC .................. 318/400.32, 400.33, 400.34, 718
See application file for complete search history.

(56) References Cited

U.S. PATENT DOCUMENTS 5,327,053 A * 7/1994 Mann ...................... H02P 6/182
318/400.04
5,969,491 A * 10/1999 Viti ......................... H02P 6/182
318/400.13

(Continued)

FOREIGN PATENT DOCUMENTS

DE   10 2007 050 663 A1   4/2009
WO   WO 90/12278   10/1990

(Continued)

OTHER PUBLICATIONS

Cristian De Angelo, et al., A Rotor Position and Speed Observer for Permanent-Magnet Motors with Nonsinusoidal EMF Waveform, IEEE Transactions on Industrial Electronics, vol. 52, No. 3, Jun. 2005, pp. 807-813.

(Continued)

*Primary Examiner* — Jorge L Carrasquillo
(74) *Attorney, Agent, or Firm* — Lewis Roca Rothgerber Christie LLP

(57) ABSTRACT

A method for operating a brushless direct current motor wherein, by the energization of a plurality of armature coils which are arranged on a stator and form a three-phase current winding for generating a rotating field which rotates around the stator, and having three terminals, a rotating field is generated in order to drive a rotor, which is rotatable about an axis of rotation relative to the stator and has at least two opposing permanent magnet poles. For the determination of the position of the rotor relative to the stator a measurement voltage signal is applied between a first and second of the terminals, a resulting voltage is measured on a third of the terminals, a gradient value which indicates the gradient of (Continued)

the resulting voltage in a time interval is determined with reference to the progression over time of the resulting voltage.

13 Claims, 12 Drawing Sheets

(56) References Cited

U.S. PATENT DOCUMENTS

| | | | | |
|---|---|---|---|---|
| 2002/0030462 | A1* | 3/2002 | Matsushiro | H02P 6/085 318/727 |
| 2003/0231875 | A1* | 12/2003 | Masino | H02P 6/12 388/800 |
| 2009/0146597 | A1 | 6/2009 | Bosch | |
| 2011/0050209 | A1 | 3/2011 | Nase | |
| 2011/0057593 | A1* | 3/2011 | Williams | H02P 6/18 318/400.26 |
| 2011/0084640 | A1* | 4/2011 | Brown | H02P 6/182 318/400.35 |
| 2013/0234640 | A1* | 9/2013 | Bateman | H02P 6/26 318/400.35 |

FOREIGN PATENT DOCUMENTS

| | | |
|---|---|---|
| WO | WO 2009/047217 A2 | 4/2009 |
| WO | WO 2009/053388 A2 | 4/2009 |

OTHER PUBLICATIONS

Mihael Borissov, "FPGA-Based Universal Motor Controller with an Update Rate in the Megahertz Range".

Toshiba Corporation Leading Innovation, Product Guide 32-Bit Microcontrollers TX03 Series, Cortex—M3 based vector control mcu, © 2010, 12 pages.

Jose Carlos Gamazo-Real et al., Position and Speed Control of Brushless DC Motors Using Sensorless Techniques and Application Trends, Sensors, Published Jul. 19, 2010, vol. 10, pp. 6901-6947.

"8-Bit Flash Microcontroller Sensorless Field Oriented Control for PMSM Motors," Infineon, Application Note, vol. 1.0, May 2007, 29 pages.

Yen-Shin Lai et al., "New Initial Position Detection Technique for Three-Phase Brushless DC Motor Without Position and Current Sensors," IEEE Transactions on Industry Applications, 39/2, 2003, Abstract Only.

Loic Le Coz, Mitsubishi Electric Europe B.V. , "Evolution of Industrial Motor Control," In Depth Tutorial, 2001 Embedded System Show, 12 pages.

M. Miyamasu and K. Akatsu, "Efficiency Comparison Between Brushless DC Motor and Brushless AC Motor Considering Driving Method and Machine Design," IECON 2011—37th Annual Conference on IEEE Industrial Electronics Society, 2011, pp. 1830-1835, Abstract Only.

Hiroshi Murakami et al., "The Performance Comparison of SPMSM, IPMSM and SynRM in Use as Air-conditioning Compressor," 34th IAS Annual Meeting Conference Record of the 1999 IEEE, vol. 2, pp. 840-845.

Dorin O. Neacsu, "Space Vector Modulation—An Introduction," Tutorial at IECON2001—the 27th Annual Conference of the IEEE Industrial Electronics Society, pp. 1583-1592.

Chen Ning et al., A New Starting Method of Sensorless PMSM Motors Based on STM32F103B, Proceedings of the 29th Chinese Control Conference, Jul. 29-31, 2010, Institute of Information Science Engineering, Central South University, Beijing, China, pp. 4964-4968.

Rakesh Parekh, AN955 VF Control of 3-Phase Induction Motor Using Space Vector Modulation, Microchip Technology Inc. © 2005, 26 pages.

E. Robeischl and M. Schroedl, "Optimized INFORM measurement sequence for sensorless PM synchronous motor drives with respect to minimum current distortion," IEEE Transactions on Industry Applications, 40/2, 2004, Abstract Only.

D. Schröder, Elektrishche Antriebe Regelung von Antriebssystemen, Springer, 3rd Edition, 2009, pp. 1-1358, with English Abstract.

Schroedl, M. "Sensorless Control of AC Machines at Low Speed and Standstill based on the "INFORM" method," Industry Applications Conference, 1996, 31st IAS Annual Meeting, IAS '96, Conference Record of the 1996 IEEE, vol. 1, pp. 270-277, Abstract only.

Shiyoung Lee Ph.D. et al., "A Comparison Study of the Commutation Methods for the Three-Phase Permanent Magnet Brushless DC Motor," 2009, 7 pages.

Subin V. Sivadas, "Sensorless Control of Permanent Magnet Synchronous Motor at Low Speed," Master Thesis, Computer Engineering, Delft University of Technology, The Netherlands, 2012, pp. 1-74.

AN1946 "Sensorless BLDC Motor Control and BEMF Sampling Methods with ST7MC," STM Electronics, 2007, 35 pages.

Philipp Thoms, "Sensorless Sinus Communication of Brushless Motors—System Simulation, Algorithmic Optimization and SoC Integration," Diploma Thesis, Technische Universität Berlin, Oct. 22, 2011, 70 pages.

U. Vinatha et al., "Recent Developments in Control Schemes of BLDC Motors," Industrial Technology, ICIT 2006. IEEE International Conference, pp. 477-482, Abstract Only.

Paul Waide, et al., Energy-Efficiency Policy Opportunities for Electric Motor Driven Systems, International Energy Agency, OECD Publishing, 2011, 132 pages.

Chang-Liang Xia, Permanent Magnet Brushless DC Motor Drives and Controls, John Wiley & Sons, 2012, Abstract Only.

Jorge Zambada et al., AN1078 "Sensorless Field Oriented Control of a PMSM," Microchip Technology Inc., © 2010, 28 pages.

German Examination Report dated Mar. 21, 2019 issued in corresponding German Application No. DE 10 2016 102 329, 5 pages, with translation, 1 page.

\* cited by examiner

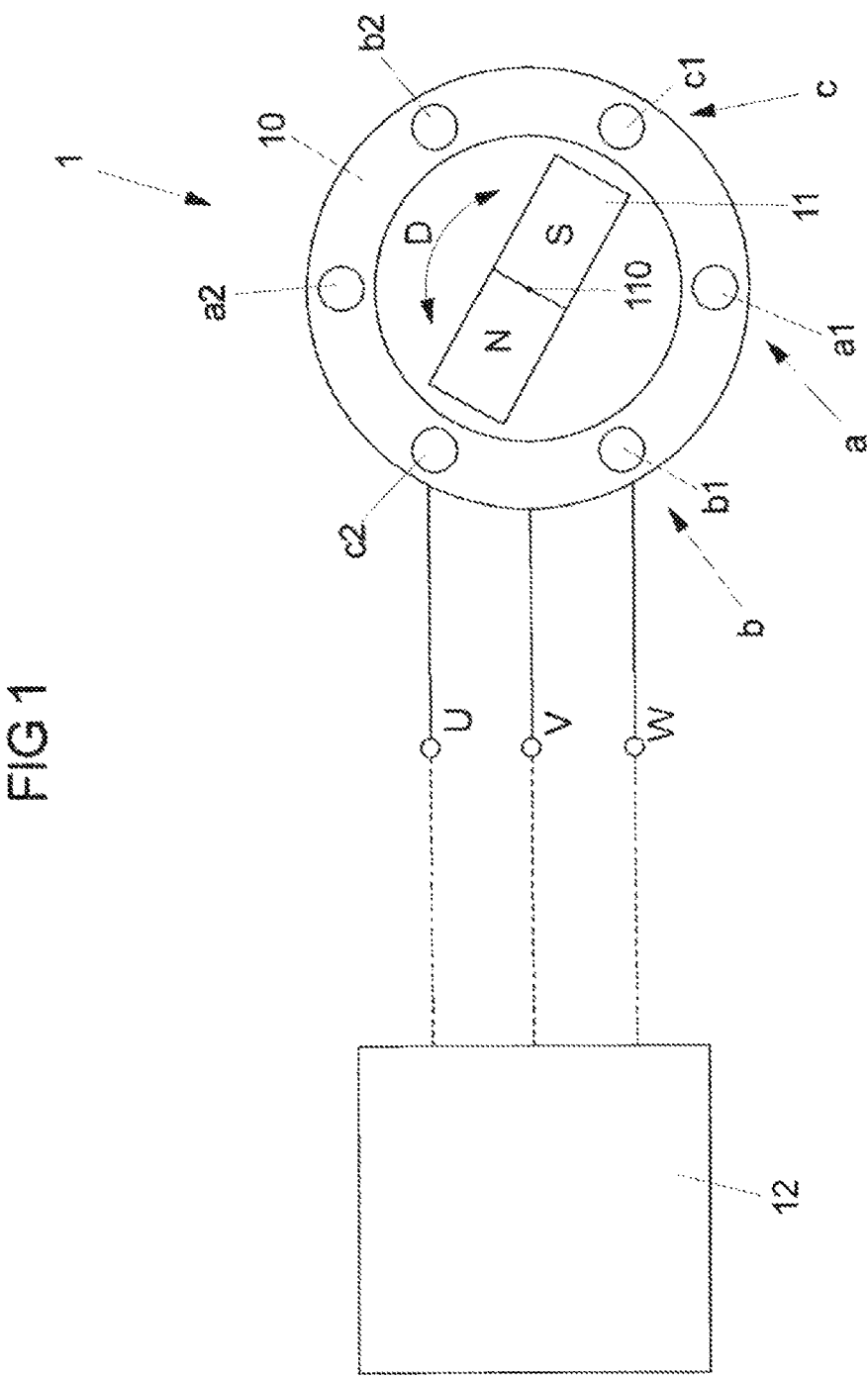

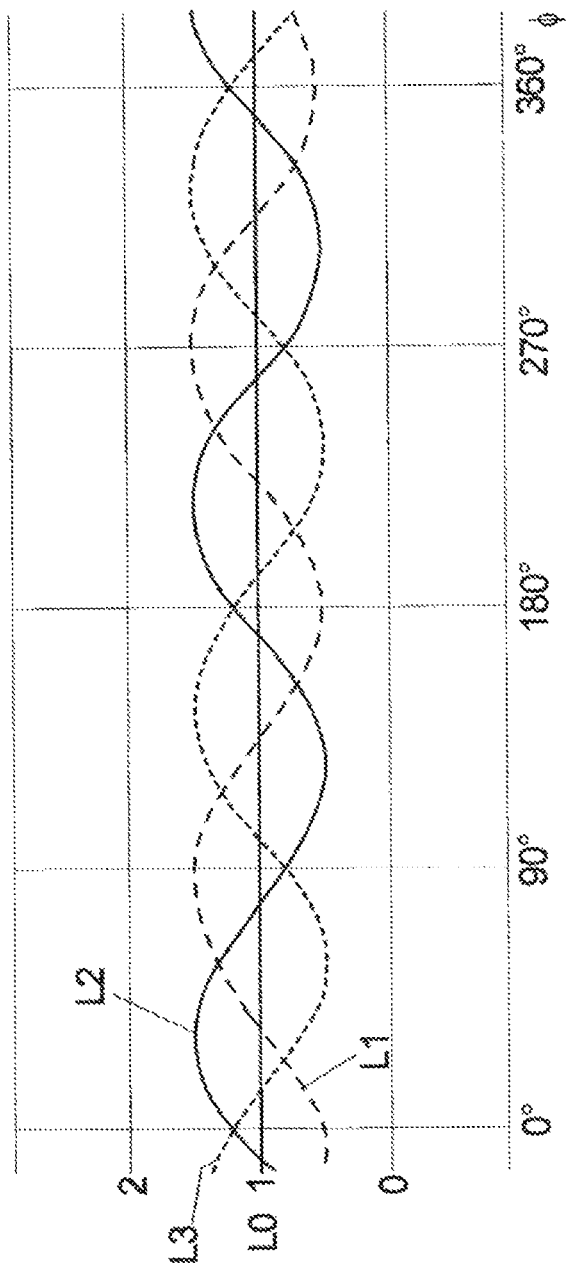

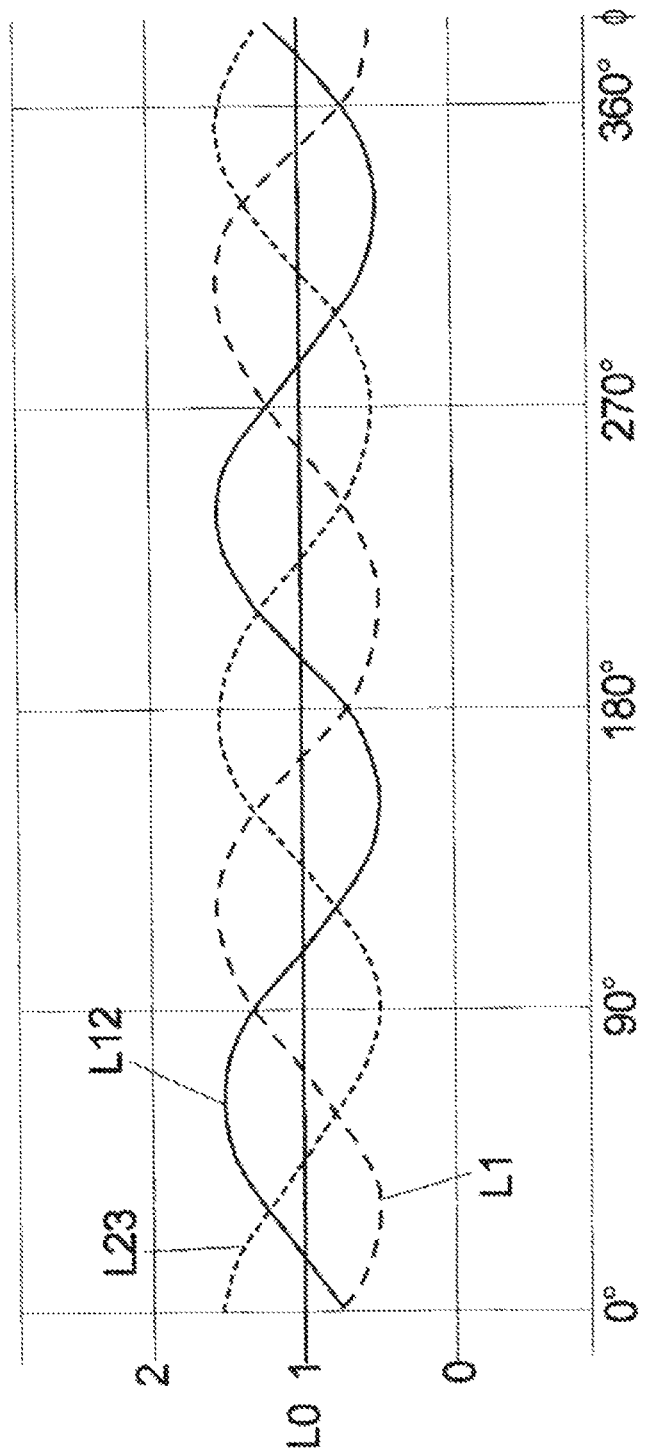

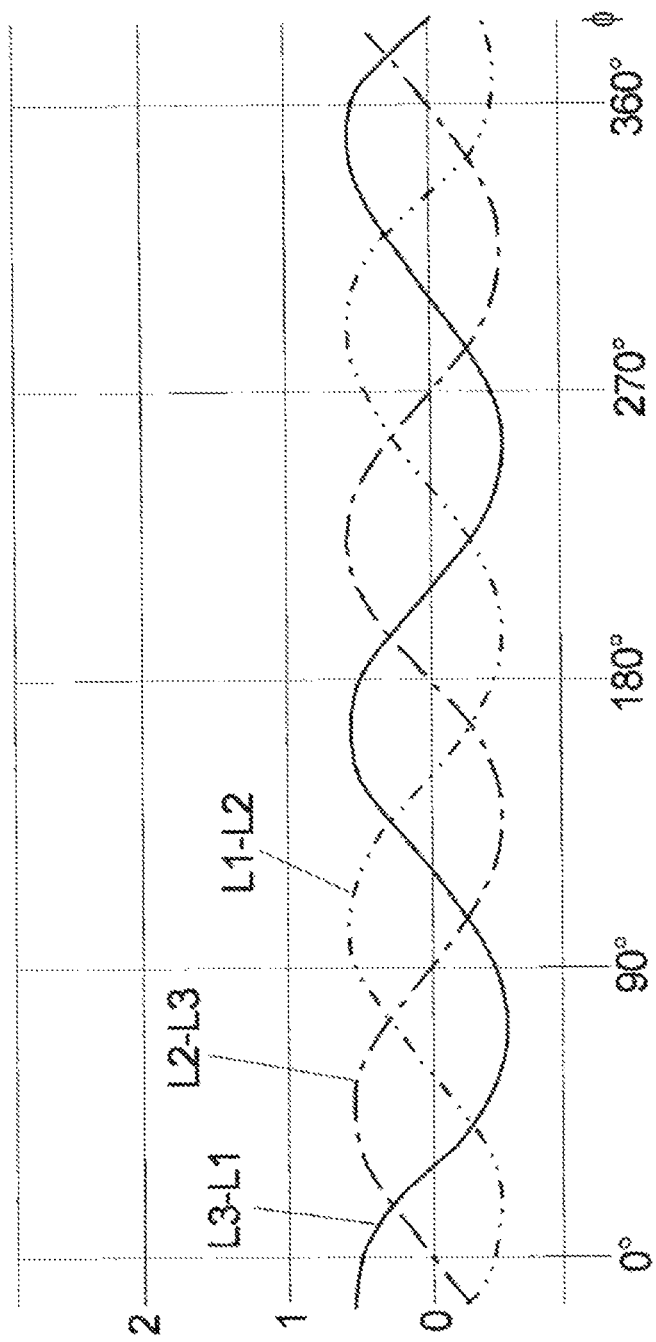

FIG 6B
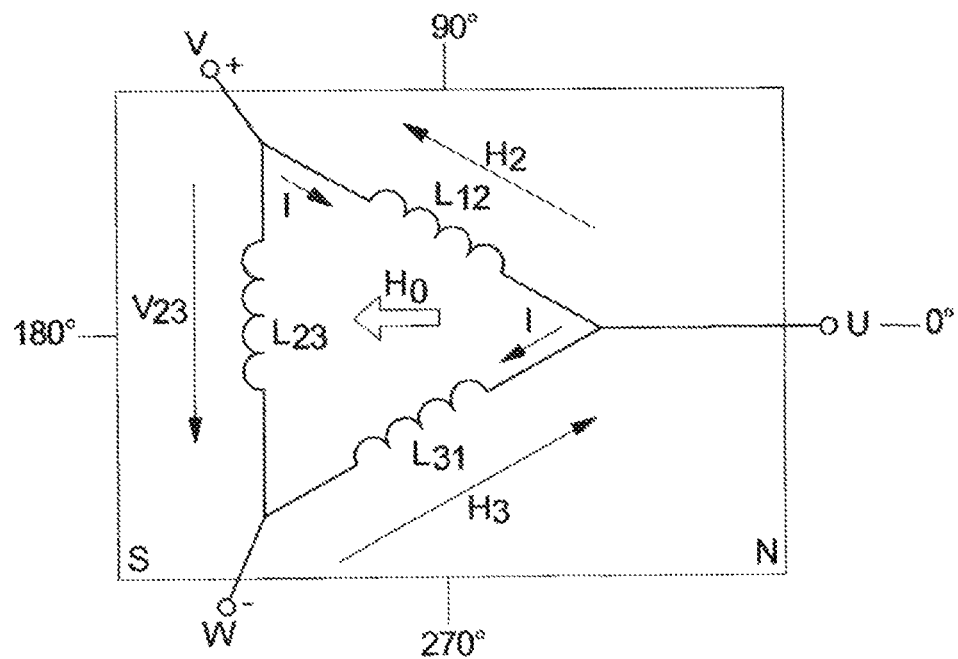
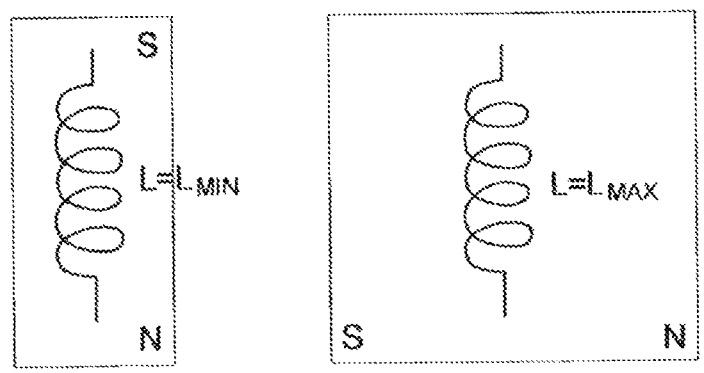

METHOD FOR OPERATING A BRUSHLESS DIRECT CURRENT MOTOR

CROSS-REFERENCE TO A RELATED APPLICATION

This application is a National Phase Patent Application of International Patent Application Number PCT/EP2016/052833, filed on Feb. 10, 2016, which claims priority of German Patent Application Number 10 2015 101 898.5, filed on Feb. 10, 2015, the entire contents of which incorporated herein by reference.

BACKGROUND

The invention relates to a method for operating a brushless direct current motor and to a brushless direct current motor.

In a method of this type, by the energization of a plurality of armature coils which are arranged on a stator, a rotating field is generated in order to drive a rotor, which is rotatable about an axis of rotation relative to the stator and has at least two opposing permanent magnet poles. The armature coils form a three-phase current winding for generating a rotating field which rotates around the stator, and have three or more terminals, by means of which the armature coils are energized.

In brushless direct current motors, a distinction is drawn between sensor-controlled commutation and sensorless commutation. Generally, in brushless direct current motors, the circumferential armature field, which is generated at the stator, is electronically commutated according to the rotor position, the rotor speed and rotor torque. Electronic commutation can thus be employed to regulate the operational performance of the direct current motor.

In sensor-controlled commutation (for "sensor-controlled brushless direct current motors"), sensors such as, for example, Hall effect sensors for the detection of the magnetic flux of the rotor, or optical sensors, are located in the region of the stator. The sensors deliver information on the rotor position, which is thus sensor-detected. Electronic commutation can be adjusted, according to the sensor-detected rotor position.

In sensorless commutation (for "sensorless brushless direct current motors"), conversely, detection of the rotor position is achieved by means of the negative field voltage, which is induced in the armature coils of the stator, can be evaluated by the control device for the determination of the rotor position, and is also described as the counter-e.m.f. (e.m.f.: induced electromagnetic force).

However, the determination of this counter-e.m.f. is only possible with effect from a minimum rotor speed, on the grounds that, below this minimum speed, the induced counter-e.m.f. is too small. Consequently, conventional brushless direct current motors have provided for the orientation of the rotor according to a specified switching model, followed by the off-load switching-in of phases for the purposes of start-up until a minimum speed is achieved, and the angular position of the rotor can be determined from the induced counter-e.m.f.

A method is therefore desirable whereby, in a sensorless brushless direct current motor, even at rest or at a low rotor speed, the angular position of the rotor can be determined, in order to start-up the motor in a reliable and efficient manner.

In a sensorless brushless direct current motor known from WO 2009/053388 A2, it is provided that, for the determination of the rotor position at rest, a measuring sequence is applied to two of three motor terminals, and a voltage is measured on the respective third, non-energized motor terminal. This voltage is compared with a reference voltage and, on the basis of the comparison, the angular range within which the rotor currently lies can be determined.

The method according to WO 2009/053388 A2 makes it possible to determine in which of six potential angular ranges a rotor is currently located. This is achieved by the application of measuring pulses in the context of a measuring sequence. However, the accurate angular determination of the rotor position at rest, during the rotation of the rotor or during block commutation by the method according to WO 2009/053388 A2 is not possible, or only possible to a limited extent.

SUMMARY

The objective of the present invention is the disclosure of a method for operating a brushless direct current motor, and of a brushless direct current motor, which permits the reliable determination of the rotor position from rest up to average speeds in externally-powered operation, or in block-commutated self-actuated operation.

This objective is fulfilled by features as described herein.

Accordingly, in the method it is provided that for determining the position of the rotor relative to the stator:
- a measurement voltage signal is applied between a first and second of the terminals,
- a resulting voltage is measured on a third of the terminals,
- a gradient value which indicates the gradient of the resulting voltage in a time interval is determined with reference to the progression over time of the resulting voltage, and
- the gradient value is taken into consideration in the determination of the position of the rotor.

For the determination of the position of the rotor, this method assumes the consideration of the variation over time of a measured and resulting voltage. For the determination of the rotor position, a measurement voltage signal is applied between two of the three terminals of a (delta-connected or star-connected) three-phase direct current motor, and the third, non-energized terminal is employed for measurement. On this third terminal, a voltage is present which (approximately) corresponds to the voltage on a (virtual) star point of the three-phase armature coils which are connected in a delta-connected or a star-connected circuit. The resulting voltage, by means of a voltage divider, defines the inductance of the first armature coil which is associated with the first terminal, and the inductance of the second armature coil which is associated with the second terminal, wherein the inductances, in turn, are dependent upon the magnetic field of the permanent magnet-excited rotor.

Depending on the angular position of the rotor, the inductance of any given armature coil is variable, on the grounds that a magnetic iron core of the armature coil is magnetized by the magnetic field of the permanently-excited rotor. The magnetization is dependent upon the angular position of the rotor, as the permanent magnet field is oriented in accordance with the angular position of the rotor in relation to the armature coil. Accordingly, the inductance of an armature coil is lower, the stronger the magnetization of the iron core by the permanent magnet field of the rotor.

The current flux in an armature coil also has an influence upon inductance. In general, upon the application of a measurement voltage signal between two terminals, the current flux is initially small, and then increases (gradually).

The current flux in an armature coil generates a local magnetic field on the armature coil, which is superimposed upon the permanent magnet field of the rotor, and can result in a field reinforcement or field attenuation of the magnetic field on the armature coil. The current flux in an armature coil can thus result in an increase (in the case of field reinforcement) or a decrease (in the case of field attenuation) of the magnetization of the iron core, thereby resulting in a reduction or increase in inductance.

As the current flux associated with the application of a measurement voltage signal varies over time, there is also a variation in the inductance, while the measurement voltage signal is applied to the terminals. This temporal variation can be evaluated, and can be employed exclusively for the determination of the angular position of the rotor, or at least considered in the determination of the rotor position.

The method employs the practice whereby a measurement voltage signal is applied to two terminals, and a resulting voltage is measured on a third, non-energized terminal. As the inductances of the armature coils acting between the first terminal and the second terminal vary during the application of the measurement voltage signal, as a result of the current flux in said armature coils, there is also a variation in the voltage divider of the armature coils, which influences the measured resulting voltage. The (positive or negative) gradient of the resulting voltage thus reflects the temporal variation of the inductances associated with the current flux in said inductances, according to the angular position of the rotor. From the temporal variation in the resulting voltage, it is therefore possible to conclude, directly or indirectly, the angular position of the rotor, that is to say the rotor position.

For the application of the measurement voltage signal, a supply voltage potential is preferably connected to the first terminal, and a ground potential is connected to the second terminal. Conversely, the third terminal is switched to a high-impedance state, such that the resulting voltage can be measured on this third terminal. The resulting voltage gives at least an approximation of the neutral point voltage of a voltage divider circuit comprised of two armature coils.

The measurement voltage signal is preferably comprised of individual measuring pulses. These measuring pulses preferably have different polarity symbols such that—in one configuration—a current flux is generated in the armature coils of the first terminal and the second terminal, the integral value of which is cleared forthwith. Accordingly, a first measuring pulse wherein, for example, the supply voltage potential is connected to the first terminal and the ground potential is connected to the second terminal, generates a current flux through the armature coils assigned to the first terminal and to the second terminal in a first direction. Conversely, the second measuring pulse, which has an inverse symbol, and wherein the supply voltage potential is thus connected to the second terminal and the ground potential is connected to the first terminal, generates a current flux through the armature coils assigned to the first terminal and to the second terminal in an opposing, second direction. In this manner, it is achieved that an electromotive force generated by the current flux is cancelled out at its mid-point, such that the rotor is not set in a rotary motion.

In general, the current in the armature coils associated with the measurement voltage signals is so small that the rotor is not actuated and, specifically, no electromotive force is generated which exceeds the locking torque of the rotor. Should some movement of the rotor nevertheless occur, this movement is halted again by a subsequent measuring pulse having an inverse polarity symbol.

The measuring pulses in each case preferably have an at least approximately constant voltage plateau. In the context of a measuring pulse, for example, the supply voltage is applied to the first terminal at a constant amplitude over a predefined time interval. Conversely, in the context of the second measuring pulse, the supply voltage is applied at a constant amplitude to the second terminal, such that a measuring pulse with an inverse polarity symbol is generated.

The second measuring pulse can be succeeded by further measuring pulses, wherein the integral value of the measuring pulses is advantageously cleared in full forthwith. A third measuring pulse can have the same symbol as the second measuring pulse wherein, however, the fourth measuring pulse will again have an inverse polarity symbol in relation thereto.

Advantageously, during the first measuring pulse and during the second measuring pulse, respective voltage values for the resulting voltage are determined. The voltage which is set on the non-energized third terminal during a measuring pulse is thus measured wherein, to this end, the resulting voltage over the duration of each measuring pulse is scanned and averaged in an appropriate manner.

From the first resulting voltage value, obtained during the first measuring pulse, and from the second resulting voltage value, obtained during the second and inverse measuring pulse to the first measuring pulse, a differential value can thus be determined. By forming the differential between the first resulting voltage value and the second resulting voltage value, effects which are superimposed on the measurement can be eliminated. For example, during the rotation of the rotor at a low speed, an induced counter-e.m.f. can occur in the individual armature coils, which is superimposed on the neutral point voltage of the voltage divider. By the mutual subtraction of the voltage values obtained during the different measuring pulses, this induced counter-e.m.f. is eliminated, such that the counter-e.m.f. has no influence upon the variable for the voltage divider determined.

The differential is constituted from the resulting voltage values, with the voltage value during the first measuring pulse as the minuend, and the voltage value during the second measuring pulse as the subtrahend. An additional constant voltage which is applied during the measurement of the minuend and the subtrahend is thus subtracted therefrom, and has no influence upon the differential value. Conversely, a voltage value which is dependent upon the voltage vector, e.g. the displacement of the neutral point voltage associated with the ratio of inductances in the minuend, and the inverse displacement of the neutral point voltage associated with the inverse ratio of inductances in the subtrahend, is retained as a difference in the differential.

Effects which are superimposed on the measurement are thus eliminated. For example, at a low speed of rotation of the rotor, an induced counter-e.m.f. can occur in the measuring probe and the coils of the voltage divider. Upon the rotation of the rotor, the voltage value measured on the terminal no longer corresponds to the neutral point voltage of the voltage divider but, amongst other factors, is distorted by the induced electromotive voltage of the coil of the measuring probe. However, as the induced counter-e.m.f. within the time interval of the measurement is approximately constant, and its sign is maintained, this error can be virtually entirely eliminated by the subtraction of two measurements.

In the coils of the voltage divider, in a similar manner, a voltage is induced by the rotation of the permanent magnet, such that the neutral point voltage of the voltage divider is already distorted by an induced voltage. For this reason, even a delta-connected direct current motor is not free of the error associated with the imposition of the induced voltage, although the neutral point voltage can be measured directly on the phase terminal. However, the error associated with the induced voltage in the voltage divider is also compensated by the differential in two measurements.

The interference value of the induced electromotive voltage can also be determined without the application of a voltage between two terminals in conjunction with a measuring pulse. To this end, up to the measuring terminal, all further phase terminals are switched to a potential, by means of which the voltage divider is cleared and a voltage set on the measuring terminal which corresponds exclusively to the induced electromotive voltage. After the deduction of the potential (applied in the compensating measurement), the result is the induced electromotive voltage, the value of which can be employed for the purposes of compensation (of the induced voltage obtained in an individual neutral point voltage measurement).

By the mutual subtraction of the voltage values obtained during the different measuring pulses in general, or by subtraction incorporating an additional and temporally adjacent compensating measurement specifically, the systematic error of an induced voltage which occurs during the rotation of the rotor at low speed can be eliminated, in order to determine the relevant magnitude of the neutral point voltage of the voltage divider, with no distortion associated with an induced electromotive voltage.

For the determination of the rotor position, measurements will preferably be taken for all the terminal combinations. Thus, where three terminals are provided, there are three terminal combinations, each of which receives measuring pulses of different polarity symbols. This gives six voltage values from which, for example, three differential values are determined.

In the current-controlled block-commutated operation of the motor phases, conversely, at least two phase terminals are energized, in order to permit the generation of a torque. However, the measurement of the neutral point voltage requires one phase terminal with no current flux. Given that, in the event of block commutation, this precondition is only fulfilled for one phase terminal, the number of six potential measuring combinations is reduced to two. A plurivalent position can nevertheless be determined from the differential of two measuring combinations, provided that the maximum amplitude of the inductance differential function is known.

In the knowledge of the maximum amplitude of the inductance differential, an additional option is provided for positional determination using only one measuring pulse or one measuring combination. At low speeds of rotation the induced electromotive voltage. can also be compensated by means of an additional measurement of the electromotive voltage. For a compensating measurement of this type, two phase terminals are simultaneously connected to the ground potential or to the supply voltage, and the electromotive voltage is measured on the third, non-energized phase terminal. This compensating measurement is executed shortly before or after the application of the single measuring pulse, in order to restrict the influence of a temporal variation in the electromotive voltage to a minimum. By the subtraction of the measured electromotive voltage from the phase voltage (measured upon the application of the measuring pulses), the neutral point voltage can be determined with the exclusion of an induced electromotive voltage (which is constant for that period). By means of the corrected neutral point voltage, and in the knowledge of the maximum amplitude of the inductance differential, a plurivalent position of the rotor can ultimately be concluded.

In a rotation of the rotor through 360° (with reference to the electrical angle), the inductance of an armature coil varies according to the rotor position, in a simplified representation, as follows:

$$L_1(\Phi) = L_0 \cdot (1 - b \cdot \cos(2 \cdot \Phi))$$

where $L_1$ is the inductance of an armature coil, $\Phi$ is the rotor angle, $L_0$ is a base value for inductance (around which the inductance value varies) and b is the variation factor. If b, for example, is 50%, the minimum inductance value, for example at an angle of 0° is 0.5 $L_0$ whereas, the maximum inductance value at an angle of e.g. 90° is 1.5 $L_0$.

The inductance of the armature coil $L_1$ is at a minimum where the excitation field vector of the permanent magnet-excited rotor and the armature field vector of the rotating armature field are at a mutual angle of 0° and 180°. Conversely, at 90° and 270°, the inductance is at a maximum. It thus proceeds that, on the basis of the variation in inductance according to the angular position of the rotor, no unequivocal conclusion can be drawn with respect to the angular position of the rotor but, by the evaluation of differential values for different terminal combinations associated with measuring pulses, two solutions which are mutually offset by 180° are obtained.

In order to achieve an unequivocal solution—in one configuration of the method—gradient values for the voltage within the time interval of the measuring pulses can be considered. Thus, with reference to gradient values from the two-fold result determined on the basis of differential values, the correct result is determined. This is achieved by virtue of the fact that, for each different terminal combination, a gradient value is determined and, with reference to the different gradient values, a check is executed as to which symbol represents the gradient for which terminal combination. On the basis of the symbol of the gradient, i.e. information as to whether the terminal combination involves a positive gradient or a negative gradient, a conclusion can be reached with regard to the angular range in which the rotor is located, and thus whether or not an angular displacement of 180° is to be added to the angular position determined from the differential values.

For three measurement voltage signals consisting of two terminal combinations respectively (if a measuring voltage signal involves different and mutually-inverse measuring pulses), there are six resulting gradient values which, for each measurement voltage signal, are preferably averaged to a total of three gradient values which, in turn, can be evaluated separately or in combination, in order to determine whether or not an angular displacement is to be added for the determination of the rotor position. For the consideration of this decision, e.g. the strongest measured gradient of the three averaged gradient values is employed, which occurs if the measuring probe or the phase terminal is oriented in the direction of a permanent magnet pole. The selection of the relevant gradient value proceeds e.g. with reference to both potential solutions, which are mutually offset by 180°, derived from the differential values. However, a common decision value can also be constituted from all three gradient values in that, according to the angular region of the two solutions which are mutually offset by 180°, the individual values are subtracted from, or added to a common value.

At this point it should be observed that, in principle, the rotor position can be determined from the gradient values alone. The gradient thus varies sinusoidally according to the angular position of the rotor. By the evaluation of the three averaged gradient values, in principle, an unequivocal conclusion can already be drawn with respect to the absolute position of the rotor.

The method described can advantageously be employed, when the rotor is at rest, to determine the position of the rotor. The method can further be employed for the compensation of the counter-e.m.f. associated with externally-powered rotation up to average speeds of rotation, and with self-actuated rotation in block-commutated operation from rest up to average speeds of rotation.

The object is also fulfilled by a brushless direct current motor, having:
- a stator, upon which a plurality of armature coils are arranged, which form a three-phase current winding for generating a rotating field turning on the stator, and three terminals,
- a rotor, which is rotatable about an axis of rotation relative to the stator, and has at least two opposing permanent magnet poles, and
- a control device for the energization of the armature coils to generate the rotating field.

It is thus provided that the control device is configured, for the determination of the position of the rotor relative to the stator:
- to apply at least one measurement voltage signal between a first and second of the terminals,
- to measure a resulting voltage on a third of the terminals,
- to determine a gradient value which indicates the gradient of the resulting voltage in a time interval from the progression over time of the resulting voltage, and
- to consider the gradient value in the determination of the position of the rotor.

The aforementioned advantages and advantageous configurations of the method apply analogously to the brushless direct current motor such that, to this end, reference shall be made to the subject matter described above.

BRIEF DESCRIPTION OF THE DRAWINGS

The fundamental concept of the invention is described hereinafter with greater detail, with reference to the exemplary embodiments represented in the figures.

FIG. 1 shows a schematic representation of a sensorless brushless direct current motor.

FIG. 4A shows a graphic representation of the inductances of the armature coils, plotted against the angle of the rotor, for the star-connected circuit in FIG. 2A.

FIG. 4B shows a graphic representation of the inductances of the armature coils, plotted against the angle of the rotor, for the delta-connected circuit in FIG. 2B.

FIG. 5A shows a graphic representation of the differentials between two inductances, according to the angular position of the rotor, for the star-connected circuit in FIG. 2A.

FIG. 6B shows a schematic representation of the circuit connection of the armature coils, with the superimposition of the permanent magnet field of the rotor, and with localized magnetic fields generated on the armature coils by a current flux, for the delta-connected circuit in FIG. 2B.

DETAILED DESCRIPTION

Figure 2A:
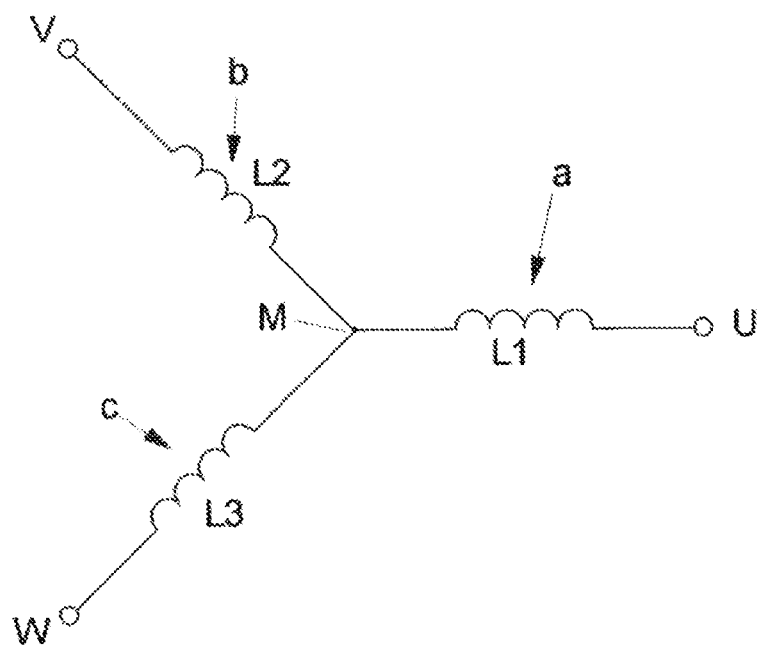
FIG. 2A shows a schematic circuit diagram of the connection of the armature coils in a star-connected circuit.

FIG. 1 shows a schematic representation of a sensorless brushless direct current motor 1, having a stator 10 and a rotor 11 which is rotatable about an axis of rotation 110. On the stator 10, a plurality of armature coils a-c are arranged, with conductors a1, a2, b1, b2, c1, c2 fitted to the stator 10, which can be energized via the terminals U, V, W. The rotor 11 is permanent magnet-excited, and has a plurality of (paired) opposing magnetic poles N, S, which cooperate with the field of the armature coils a-c and, in operation, generate a rotary motion D of the rotor 11.

In operation, the direct current motor 1 is energized by means of a control device 12, in that a three-phase current is introduced at the terminals U, V, W, and a circumferential rotating field is thus generated on the stator 10. This rotating field follows the rotor 11, such that the rotor 11 is displaced in a rotary motion.

For the generation of the rotating field on the stator 10, the current fed in on the terminals U, V, W is electronically commutated. The commutation time is thus dependent upon the rotor position, thereby necessitating control of the direct current motor 1, according to the rotor position.

n sensorless commutation, detection of the rotor position during the operation of the direct current motor 1 is achieved by means of a counter-e.m.f. induced in the armature coils a-c, which can be evaluated by means of the control device 12. This is possible if the rotor 11 is rotating at a speed of rotation which exceeds a predefined minimum speed of rotation, and the induced counter-e.m.f. is thus sufficiently large.

Conversely, when the rotor 11 is at rest, or at a low speed of rotation, control by means of the induced counter-e.m.f., in the absence of any further measures, is not possible such that, specifically during the start-up of the motor 1, the rotor position must be determined in another manner.

It should be observed that the method is also applicable to a design involving an external rotor rather than an internal rotor, and to a design in which the rotor and stator are interchanged, such that the rotor is comprised of armature coils and the stator is comprised of permanent magnets.

A method for determining the rotor position at rest, or at a low speed of rotation, is described hereinafter.

The armature coils a-c can be interconnected in a star-connected circuit or a delta-connected circuit. In principle, the method described hereinafter is applicable to both types of circuit. A star-connected circuit incorporates a voltage divider comprised of armature coils, the neutral point voltage of which can be measured via the third and non-energized measuring probe (or the armature coil thereof). A delta-connected circuit incorporates a voltage divider, the neutral point voltage of which can be measured directly on the non-energized phase terminal. Hereinafter, the star-connected circuit will be addressed first.

FIG. 2A shows the interconnected armature coils a-c in a star-connected circuit, which are connected respectively to a terminal U, V, W, and have a common star point M. Each armature coil a-c has an inductance L1, L2, L3, the value of which is dependent, for example, upon the number of turns in the armature coils a-c, upon the characteristic state of the iron core, and also upon external influences, such as the magnetic field of the rotor 11, as described in greater detail hereinafter.

In this connection, it should be observed that FIGS. 1 and 2A represent only a very simple exemplary embodiment of a brushless direct current motor 1. In principle, more than three armature coils, for example six or nine armature coils, can be arranged on the stator, and more than two poles N, S, for example four, six or eight poles can be arranged on the rotor 11.

In one exemplary embodiment, the direct current motor 1 can comprise, for example, nine armature coils on the stator 10 and six magnetic poles on the rotor 11.

On the armature coils a-c, during the operation of the direct current motor 1, a circumferential rotating field is generated, which cooperates with the permanently-excited rotor field and generates an e.m.f. on the rotor 11. This is achieved, in that the terminals U, V, W are energized in an electronically-commutated manner, and a three-phase current is thus initiated in the armature coils a-c. Whereas, in the normal operation of the direct current motor 1, the determination of the rotor position, for the purposes of commutation control, can be achieved with reference to the induced counter-e.m.f. in the branches of the armature coils a-c, with no further measures, this is not possible when the rotor 11 is at rest, or at low speeds of rotation. For this reason, in the present case, a method is employed wherein, as represented schematically in FIG. 3A, measurement voltage signals V12, V23, V31 are applied between the terminals U, V, W and, with reference to said measurement voltage signals V12, V23, V31, a resulting voltage on the star point M is evaluated, and the rotor position is concluded therefrom.

For the measurement of the resulting voltage on the star point M, a measurement voltage signal V12, V23, V31 is thus applied between two terminals U, V, W, and the resulting voltage is measured on the third and non-energized terminal U, V, W. To this end, said third terminal is switched to a high-impedance state, such that the voltage on this third terminal (approximately) corresponds to the voltage on the star point M (on the grounds that, due to its high-impedance state, no current flows in the branch of the third terminal U, V, W, and the armature coils a-c in this third branch act approximately as a single conductor, which has no influence upon the measured voltage). The measurement voltage signal applied between two terminals U, V, W is comprised of measuring pulses P1-P4, as represented schematically in FIG. 3C.

The inductance L1-L3 acting on an armature coil a-c is dependent upon the position of the rotor 11. In the position of the rotor 11 represented in FIG. 3A, the magnetic field generated by the permanent magnetic poles N, S is oriented along the armature coils a, such that an iron core of said armature coil a is at least substantially magnetized. As a result of such great magnetization, the inductance L1 on this armature coil a is comparatively small, as the iron core of this armature coil a (at least substantially) is in a state of magnetic saturation. Conversely, on the other two armature coils b, c, the inductance L2, L3 is increased, as the permanent magnet field of the rotor 11 is not collinear to these armature coils b, c and, correspondingly, the iron cores of these armature coils b, c are not saturated.

The characteristic of the inductances L1-L3 in relation to the angle $\Phi$ of the rotor 11 is represented in FIG. 4. The inductances L1-L3 each have a sinusoidal characteristic, and can be described (for example, with respect to the inductance L1) by the following equation:

$$L_1(\Phi)=L_0 \cdot (1-b \cdot \cos(2 \cdot \Phi))$$

where $L_1$ is the inductance of the armature coil a, $\Phi$ is the rotor angle, $L_0$ is a base value for inductance (around which the inductance value varies) and b is the variation factor. For example, if b is 50%, the minimum inductance value e.g. at an angle of 0° is 0.5 $L_0$, whereas the maximum inductance value at an angle of e.g. 90° is 1.5 $L_0$.

From FIG. 4A it will be seen that the inductances L1-L3, plotted against the angle $\Phi$ of the rotor 11, have a cycle of 180°. In a 360° rotation of the rotor 11 (in consideration of the electrical angle, which will not necessarily coincide with the mechanical angle), each inductance L1-L3 has two maximum values and two minimum values.

By reference to the pulsed measurement voltage signals V12, V23, V31, the position (the angle $\Phi$) of the rotor 11 can be determined, wherein—according to the frequency represented in FIG. 4A—two solutions occur in the angular range between 0° and 360°, such that the rotor position cannot be determined unequivocally.

Figure 3A:
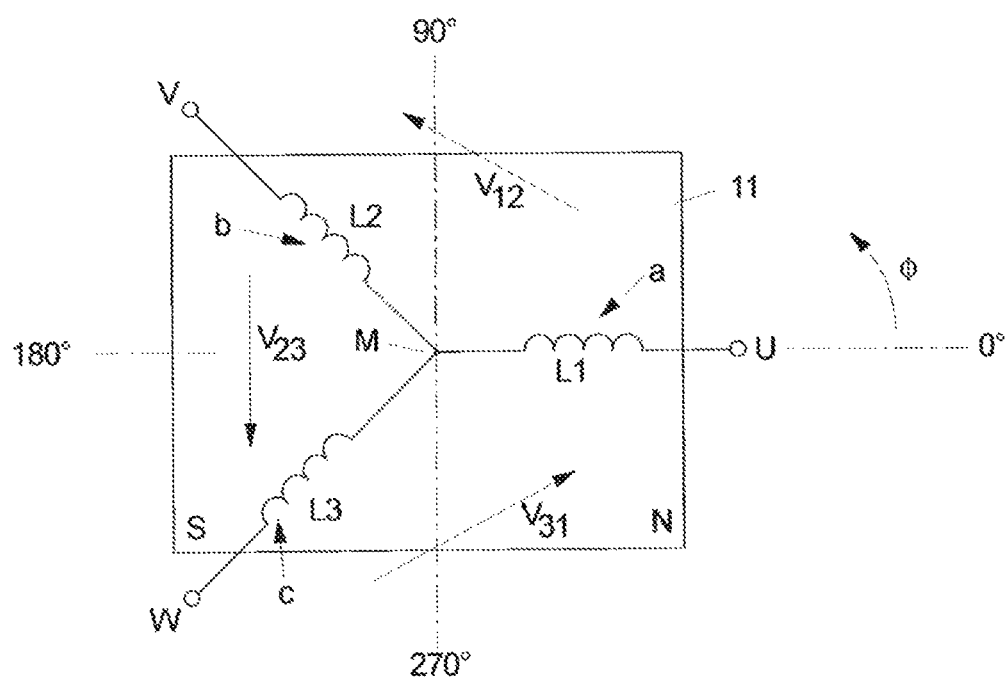
FIG. 3A shows the view according to FIG. 2A, with the rotor in a given rotor position, representing potential terminal combinations for the application of measurement voltage signals for determining the rotor position.
Figure 3B:
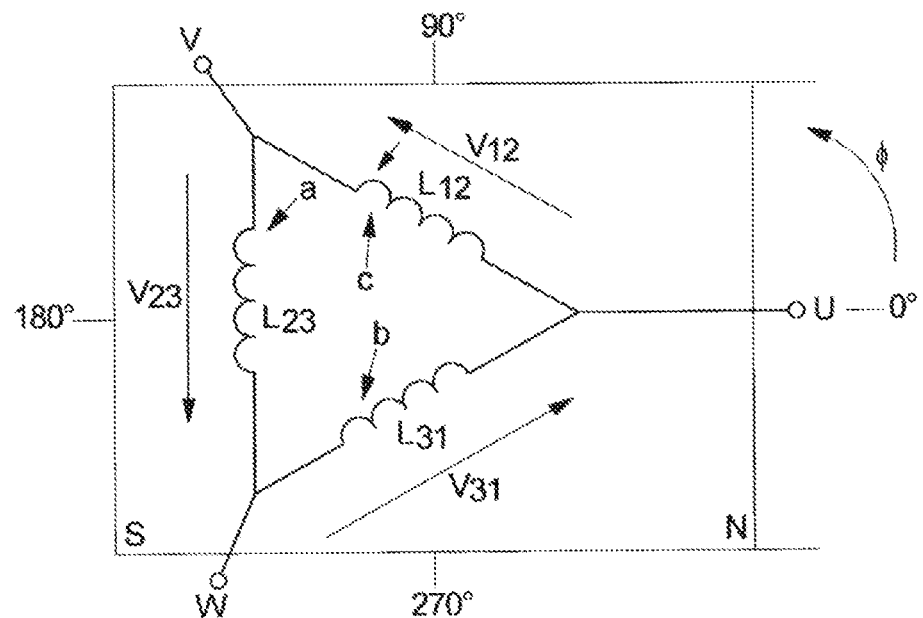
FIG. 3B shows the view according to FIG. 2B, with the rotor in a given rotor position, representing potential terminal combinations for the application of measurement voltage signals for determining the rotor position.
Figure 3C:
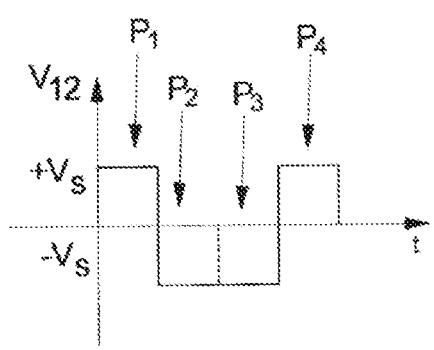
FIG. 3C shows a temporal representation of the measuring pulses of a measurement voltage signal.

For the determination of the rotor position, for each terminal combination, a measurement voltage signal is applied, for example in the form of the pulse sequence represented in FIG. 3C, between two terminals U, V, W. For example, between the terminals U, V a measurement voltage signal V12 is firstly applied wherein, firstly, a first measuring pulse P1, then a second measuring pulse P2, then a third measuring pulse P3, and finally a fourth measuring pulse P4 are switched to the terminals U, V. In the first measuring pulse P1, for example, the potential of a supply voltage VS is applied to the terminal U, whereas the other, second terminal V is switched to a ground potential. In the second measuring pulse P2, this arrangement is completely inversed, such that the supply voltage potential VS is switched to the second terminal V, and the ground potential is switched to the first terminal U. The third measuring pulse P3 is identical to the second measuring pulse, and the fourth measuring pulse P4 in turn has an inverse polarity symbol to the third measuring pulse P3.

Advantageously, the measuring pulses P1-P4 are all of equal length, and are configured such that the integral value thereof is cleared directly. This means that a current flux I generated on the armature coils a, b of the terminals U, V is approximately cancelled out at its mid-point, such that there is no resulting propulsion of the rotor 11.

Whereas, between two terminals U, V, a measurement voltage signal V12 of the form represented in FIG. 3C is applied, the third terminal W is set to a high-impedance state, and is employed for the measurement of a resulting voltage VM on this terminal W. This voltage VM approximately corresponds to the voltage on the star point M, and is determined by the voltage divider between the inductances L1, L2 in the branches assigned to the terminals U, V (this is valid, at least by approximation, as the ohmic resistances of the armature coils a-c are low):

$$V_{M,P1} = V_S \cdot \frac{L_2}{L_1 + L_2} + V_{B3}$$

where $V_{B3}$, in this case, is an induced electromotive voltage, which occurs on the terminal W upon a rotation of the rotor 11. During the second measuring pulse P2, conversely, the resulting voltage VM on the third terminal W is:

$$V_{M,P2} = V_S \cdot \frac{L_1}{L_1 + L_2} + V_{B3}$$

During the measuring pulses P1-P4, the resulting voltage VM on the third terminal W is measured, and the differential between voltage values is determined, which voltage values result during measuring pulses P1-P4 of different polarity symbols. The resulting differential value is proportional to the differential between the inductances L1, L2 of the armature coils a, b assigned to the terminals U, V:

$$\Delta_{12} = V_{M,P2} - V_{M,P1} =$$
$$V_S \cdot \frac{L_1}{L_1 + L_2} - V_S \cdot \frac{L_2}{L_1 + L_2} = \frac{V_S}{L_1 + L_2}(L_1 - L_2) \propto L_1 - L_2$$

where $\Delta_{12}$ is the resulting differential value between the voltage values for the resulting voltage VM in the first measuring pulse ($V_{M,\ P1}$) and the second measuring pulse ($V_M$, $P_2$) upon the application of the measurement voltage signal V12 to the terminals U, V. The induced voltage $V_{B3}$ on the third terminal W deviates by the differential value Δ12.

This is repeated for all the terminal combinations in that, in each case, a measurement voltage signal V12, V23, V31 is applied to two terminals U, V, W, and the resulting voltage VM is measured on the third terminal U, V, W. This gives three differential values, each of which is proportional to the differential of the inductances L1, L2, L3 in the associated branches.

Analogously to the dependence of the inductances L1, L2, L3 on the angular position of the rotor 11, the differentials L1-L2, L2-L3, L3-L1 are also dependent upon the angle Φ of the rotor 11, as represented in FIG. 5A. On the basis of the three differential values, by the application of the arctangent resulting from the division of the vectors (α, β) obtained by Clarke's transformation, the angular position Φ of the rotor 11 can be determined, wherein two solutions are obtained in the angular range between 0° and 360°, a first in the range between 0° and 180°, and a second in the range between 180° and 360°, given that the curves have a period frequency of 180°.

In order to determine which of the solutions is correct, in a further step, the gradient of the voltage VM measured on the third terminal U, V, W during the measurement voltage signals V12, V23, V31 is evaluated. This is based on the principle whereby the inductances L1-L3 vary, depending upon the current flowing in the respective armature coils a-c.

Figure 6A:
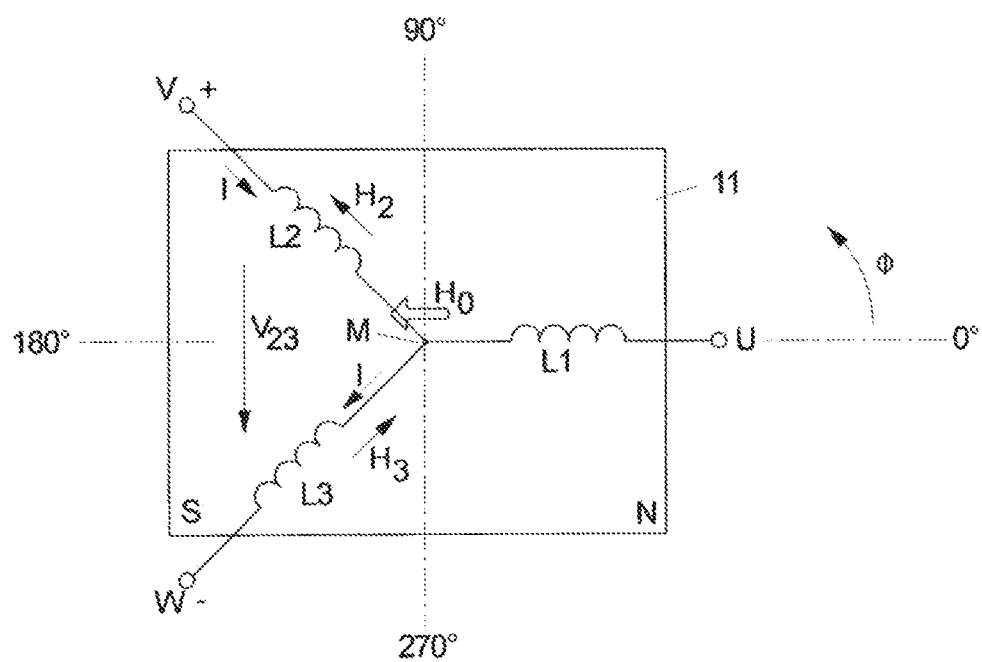
FIG. 6A shows a schematic representation of the circuit connection of the armature coils, with the superimposition of the permanent magnet field of the rotor, and with localized magnetic fields generated on the armature coils by a current flux, for the star-connected circuit in FIG. 2A.

If, for example, as represented schematically in FIG. 6A, a measurement voltage signal V23 is applied between the terminals V, W, virtually no current flows initially through the associated inductances L2, L3 upon the application of the first measuring pulse P1, as the current in these inductances L2, L3 only builds up gradually. As the current I in the inductances L2, L3 increases, this results in the constitution of a magnetic field H2, H3 on the inductances L2, L3, which is superimposed on the permanent magnet field H0 of the rotor 11 and, on the inductances L2, L3, results in a localized reinforcement or attenuation of the resulting overall field.

In the example represented in FIG. 6A, a localized field H2 occurs on the inductance L2, associated with the current flux I in the inductance L2. This magnetic field H2 is oriented with a vector component of the magnetic field H0 of the rotor 11, such that there is a reinforcement of the localized magnetic field on the inductance L2, thereby resulting in a reduction in the value of the inductance L2.

Conversely, the localized magnetic field H3 generated on the inductance L3 is inversely oriented with a vector component to the permanent magnet field H0 of the rotor 11, such that a localized attenuation of the magnetic field H0 on the inductance L3 occurs. This results in an increase in the value of the inductance L3.

Figure 6C:
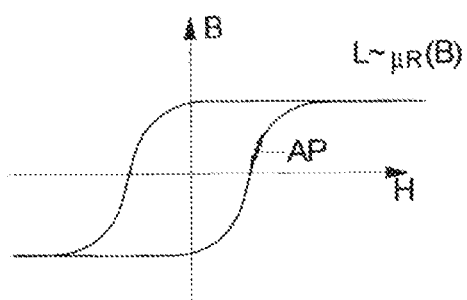
FIG. 6C shows a representation of a hysteresis curve for the magnetization of an iron core of an armature coil.

This is dictated by the fact that, as represented schematically in FIG. 6C, as a result of the hysteresis of the iron core of the armature coils b, c, the reinforcement or attenuation of the localized magnetic field results in a deviation from a working point AP. In the event of a reinforcement of the magnetic field, the magnetization of the iron core tends towards saturation, thereby resulting in a reduction in inductance. Conversely, in the event of an attenuation of the magnetic field, magnetization is reduced and, as represented in the example in FIG. 6C, shows a downward trend, thereby resulting in an increase in inductance.

The greater the current flux I, the stronger the variation in the inductance values on the inductances L2, L3. During a gradual build-up of current, this therefore results in a variation in inductance values, which also leads to a variation in the voltage divider, and thus directly to the perceptible temporal variation in the resulting voltage VM which is measured at the star point M via the third terminal U.

Figure 7:
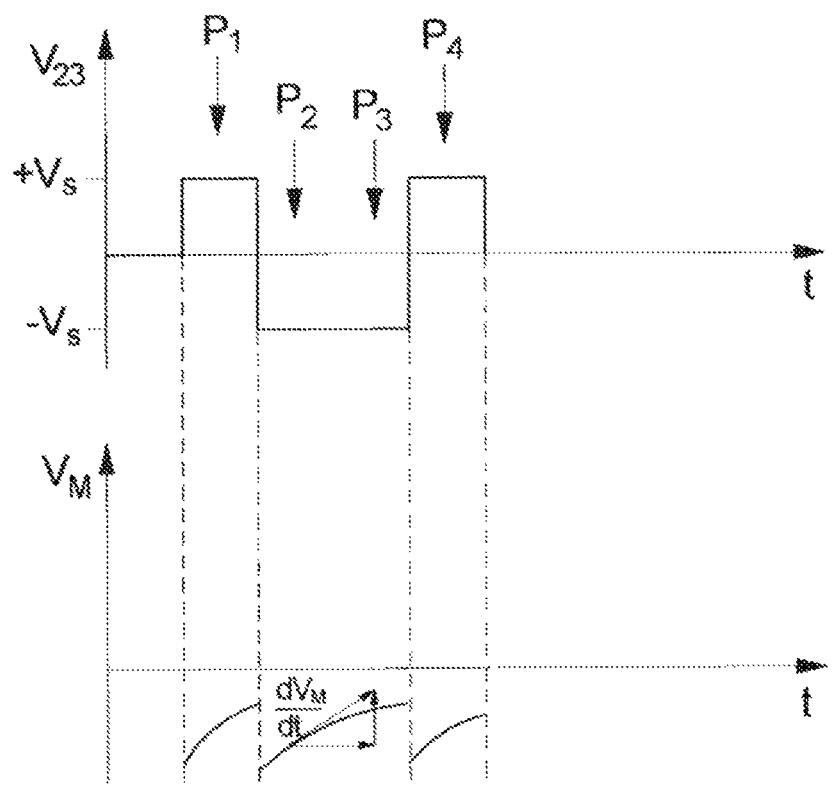
FIG. 7 shows a schematic representation of measuring pulses to be applied between two terminals, and of a resulting voltage on a third terminal, for a star-connected and a delta-connected circuit.

This is represented schematically in FIG. 7. By the application of measurement voltage signal V23 during the individual measuring pulses P1-P4, a time characteristic is given for the resulting voltage VM measured on the third terminal U, to which a gradient value can be assigned.

The gradient has a positive or a negative symbol and, by reference to the gradient, it can be determined whether the position of the rotor lies in the angular range between 90° and 270°, or in the angular range between 270° and 90°.

Figure 8:
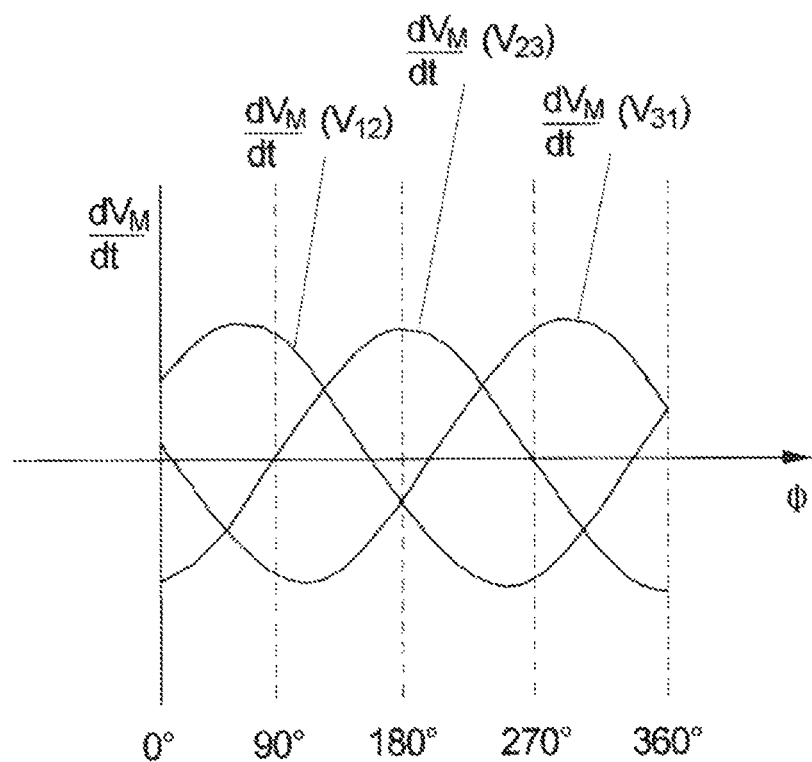
FIG. 8 shows a graphic representation of the gradient of the resulting voltage for the different terminal combinations of a star-connected or delta-connected circuit, according to the angular position of the rotor.

In principle, the gradient thus likewise shows a sinusoidal characteristic, which is dependent upon the rotor position, as represented in FIG. 8. The gradient for the measurement voltage signal V23 between the terminals V, W assumes, for example, a minimum value at 0° and a maximum value at 180°, and has a period frequency of 360°.

If the gradient of the resulting voltage VM is measured for all the terminal combinations, this generates three non-redundant gradient values, which can be evaluated in combination in order to conclude the angular range within which the rotor position lies.

If, for example, the gradient of the measurement voltage signal V12 has a negative symbol and the gradients of the measurement voltage signals V31 have a positive symbol, it is clearly determined that the rotor 11 lies in the angular range between 180° and 360°, which can be considered in the calculation of the rotor position based upon differential values (FIG. 5), in order to permit the selection of the correct option from the two potential solutions.

A gradient value for a control signal V12, V23, V31 can be determined, by virtue of the fact that the gradient is determined during a measuring pulse P1-P4, or in that the gradient is averaged from the gradient at the different measuring pulses P1-P4.

In this connection, it should be observed that, in principle, it is also possible to conclude the absolute rotor position from the gradients alone. The gradients, as can be seen in FIG. 8, show a sinusoidal characteristic which is dependent upon the angle $\Phi$, with a period frequency of 360°, thus permitting a clear calculation of the rotor position from the three gradient values alone. However, as the strength of the superimposed magnetic field is lower than that of the permanent magnet, the measured value of the gradient, in comparison with the differential value, is likewise smaller and thus more susceptible to interference such that, in the interests of more exact positional identification, the two-fold result derived from differential values will advantageously be considered.

Figure 2B:
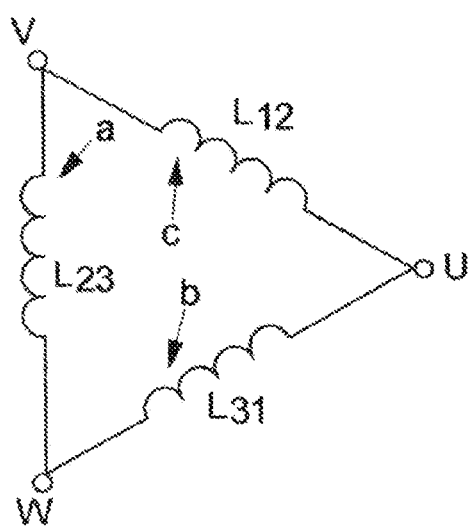
FIG. 2B shows a schematic circuit diagram of the connection of the armature coils in a delta-connected circuit.

The method described can be applied in an identical manner to a delta-connected circuit arrangement. FIG. 2B shows a schematic representation of the connection of the armature coils a-c from FIG. 1 in a delta-connected circuit. The geometric orientation of the armature coils a-c relative to the permanent magnet 11 in FIG. 2B corresponds to that in FIG. 2A, with the rotor rotated through 90°. The inductances L23, L12, L31 of the armature coils a-c from FIG. 2B are graphically represented in FIG. 4B for one rotation of the permanent magnet 11 over an angular range of 360°. In a comparison of FIGS. 4A and 4B, as can also be seen in FIGS. 2A and 2B, the inductance values of the armature coils a-c are displaced by an angle of 90°.

Figure 5B:
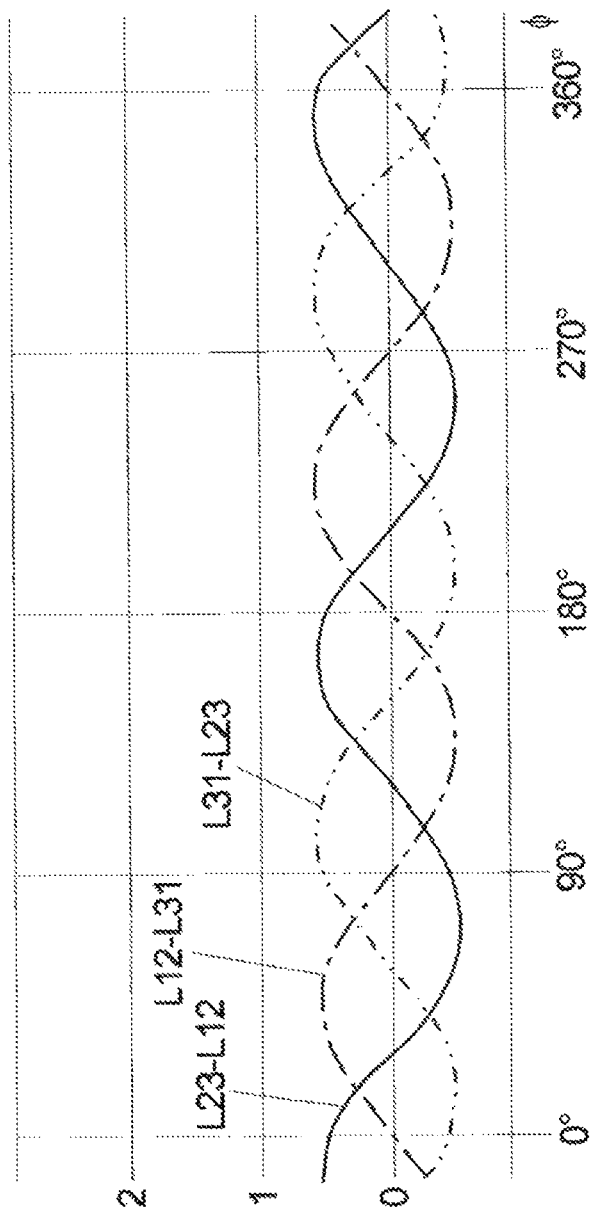
FIG. 5B shows a graphic representation of the differentials between two inductances, according to the angular position of the rotor, for the delta-connected circuit in FIG. 2B.

The measured voltages associated with the signals V12, V23, V31 in FIG. 3B occur with inverse symbols on the armature coils a-c with the same designation to FIG. 3A. For example, the measurement voltage signal V12 in FIG. 3B drops across the armature coils b, a, whereas in FIG. 3A it drops across the armature coils a, b. In FIG. 5B, the same inductance differentials for the armature coils a-c have been constituted from the result of the measurement voltage signals V12, V23, V31 as in FIG. 5A. For the measurement voltage signal V12, comprised of the measuring pulses P1-P4, for example in a delta-connected circuit, the differential $\Delta_{12}$ is constituted from the resulting neutral point voltages of the voltage divider of the inductances $L_{23}, L_{31}$ on the terminal W as follows:

$$\Delta_{12} = V_{M,P2} - V_{M,P1} =$$
$$V_S \cdot \frac{L_{23}}{L_{31}+L_{23}} - V_S \cdot \frac{L_{31}}{L_{31}+L_{23}} = \frac{V_S}{L_{31}+L_{23}}(L_{23}-L_{31}) \propto L_{23}-L_{31}$$

The comparison of the inductance differentials from FIG. 5A and FIG. 5B shows that the result of the differential for the measurement voltage signals V12, V23, V31 is independent of the configuration as a star-connected or delta-connected circuit. A rising current flux in the coils of the delta-connected circuit associated with the measurement voltage signals likewise results in a superimposed magnetic field, and thus in a temporal variation in the neutral point voltage of the voltage divider, generating the same gradients within a measuring pulse (represented in FIG. 7 and FIG. 8 for the star-connected circuit). The method is therefore identically applicable for a delta-connected armature coil arrangement.

Once the rotor position has been determined, the control of the direct current motor 1 can proceed in accordance with the rotor position. Commutation for the feeding-in of the rotating field to the terminals can thus proceed in accordance with the rotor position thus determined.

The measuring pulses P1-P4 of a measurement voltage signal V12, V23, V31 preferably have a uniform duration such that, in total, no current is imposed upon the armature coils, but can also be of any preferred differing duration such that, preferably, in block operation e.g. a torque-generating current is imposed on the armature coils. Determination of the rotor position can be executed prior to start-up (and will be unequivocal, with the rotor at rest), or can be plurivalent and executed progressively during block operation.

In the current-controlled block operation of the motor, the measuring pulses P1-P2 of only one measurement voltage signal V12 or V23 or V31 are applied, according to the position, and the resulting neutral point voltage thereof is measured. Thus, in block operation, in a sectional manner, an inductance differential can be accurately determined from the inductance differentials represented in FIG. 5A and FIG. 5B. By a comparison of the present amplitude, and in the knowledge of the maximum inductance differential, four potential positions can be concluded. With reference to an initial and unequivocal positional determination, executed prior to block operation, and a measurement signal rate which is significantly higher than the frequency of electrical rotation, it can be assumed that the correct solution is represented by that position which lies closer to the preceding unequivocal position. Given that, as represented in FIG. 7, the imposed magnetic field of the armature coils influences the permanent magnetic field as the current rises, as a result of which the neutral point voltage is displaced and the voltage drop across the resistance of the armature coils is no longer negligibly small, it may be necessary, in the event of a higher phase current, to process the sectionally-calculated function per block segment and current amplitude by means of scaling and displacement. The magnetic pole can be validated with reference to this displacement, as the neutral point voltage of an adjoining block segment is inversely influenced by the current, resulting in a positive or negative step change in the measured data, further to the switchover of the measurement voltage signal.

In order to keep the torque error associated with a measurement voltage signal in opposition to the current direction to a minimum, the number of measuring pulses P1-P4 can be reduced to a single measuring pulse (in the form of a measuring pulse P1 or a measuring pulse P2, c.f. FIG. 3C). To this end, however, an additional compensating measurement, with no imposition of a voltage drop on the armature coils a-c, has to be executed in order to determine the superimposed induced electromotive voltage on the third terminal, which constitutes an influencing variable for the measurement of the neutral point voltage on the voltage divider. To this end, the influencing variable of the induced electromotive voltage on the third terminal is individually measured immediately before or after the application of the measuring pulse. For the compensating measurement, the terminals (e.g. V and W in FIG. 6A) between which the measuring pulse has been applied or is to be applied, are set to the ground potential or the potential of the supply voltage, such that no voltage is present between the terminals of the motor and the neutral point voltage corresponds to the potential on the terminals (V, W) (corresponding to the ground potential or the supply voltage). On the third terminal (U), the induced electromotive voltage can then be measured directly, using the potential of the applied voltage as a reference value.

In practice, one of the two voltage values of the voltage vector is limited to a value which is close to the terminal voltage, such that the compensating value of the counter-e.m.f. is included in a single measurement.

Experiments have shown that, by the method described, the position of the rotor at rest can be determined to an accuracy of +/−3° or, under certain circumstances, to an accuracy of even +/−1°.

The fundamental concept of the invention is not limited to the exemplary embodiments represented heretofore, but can also be realized, in principle, by forms of embodiment of an entirely different design.

In principle, the scanning of the measured resulting voltage can be executed by any means preferred, for example by the use of an analog-digital converter for digital evaluation. During one measuring pulse, any number of scanned values can be captured, in order to determine a value for the resulting voltage and/or the gradient thereof, on the basis of the scanned values.

LIST OF REFERENCE SYMBOLS 1 brushless direct current motor
10 stator
11 rotor
110 axis of rotation
12 control device
a-c armature coils
a1, a2, b1, b2, c1, c2 conductors
AP working point
D rotary motion
I current flux
L0 average inductance value
L1-L3 inductance
M star point
N, S permanent magnet pole
P1-P4 measuring pulse
t time
U, V, W terminal
V12, V23, V31 voltage vector
VM resulting voltage
VS supply voltage
Φ angle

The invention claimed is:

1. A method for operating a brushless direct current motor, the method including:
energizing, by applying an electronically commutated electrical energization signal, a plurality of armature coils arranged on a stator and forming a three-phase current winding for generating a rotational field rotating around the stator, the armature coils having three terminals and the rotating rotational field being generated in order to drive a rotor, which is rotatable about an axis of rotation relative to the stator and comprises at least two opposing permanent magnet poles;
determining the position of the rotor relative to the stator, wherein the determining includes:
applying a measurement voltage signal between a first and second of the terminals, wherein the applying includes connecting a supply voltage potential to the first terminal and a ground potential to the second terminal, or connecting a supply voltage potential to the second terminal and a ground potential to the first terminal, wherein the measurement voltage signal is comprised of at least one measuring pulse different than said electrical energization signal,
measuring a resulting voltage on a third of the terminals, wherein the third terminal, for the measuring, is switched to a high-impedance state,
determining, from a variation of the resulting voltage over time within a time interval, a gradient value indicating a gradient of the resulting voltage in said time interval, and
using the gradient value for determining the position of the rotor.

2. The method as claimed in claim 1, wherein, in a paired arrangement, a measurement voltage signal is applied between two of the three terminals, and a resulting voltage is measured on the third terminal, wherein this measurement is repeated for at least part, and preferably all of the potential terminal combinations.

3. The method as claimed in claim 2, wherein the position of the rotor is determined with reference to the different measurements for the different terminal combinations.

4. The method as claimed in claim 2, wherein, for the different terminal combinations, at least one gradient value is determined respectively and, with reference to the different gradient values for the terminal combinations, it is established whether a predefined angular displacement, specifically 180 degrees, is to be added to the position of the rotor thus determined.

5. The method as claimed in claim 4, wherein the measurement voltage signal is comprised of at least a first measuring pulse and a second measuring pulse of a different polarity symbol.

6. The method as claimed in claim 4, wherein the measurement voltage signal is comprised of a measuring pulse, during the measuring pulse, a value for the resulting voltage is determined wherein, prior to the application of the measuring pulse or after the application of the measuring pulse, a compensating measurement is executed for the determination of an induced electromotive voltage.

7. The method as claimed in claim 6, wherein, for the compensating measurement, the same potential is applied to the first terminal and to the second terminal, specifically a ground potential or the potential of a supply voltage, and a resulting voltage is measured on the third terminal, in order to determine the induced electromotive voltage from the resulting voltage.

8. The method as claimed in claim 6, wherein the value of the resulting voltage is corrected by the value of the induced electromotive voltage determined by the compensating measurement, and the position of the rotor is determined from the corrected electromotive voltage.

9. The method as claimed in claim 5, wherein, during the first measuring pulse a first resulting voltage value, and during the second measuring pulse a second resulting voltage value is determined.

10. The method as claimed in claim 5, wherein, during each measuring pulse a value for the gradient in a time interval is determined and, from the individual values, a gradient value is determined by the constitution of an average.

11. The method as claimed in claim 9, wherein, by the mutual subtraction of the first resulting voltage value and the second resulting voltage value, a differential value is determined, and the position of the rotor is determined with reference to the differential value.

12. The method as claimed claim 1, wherein the position of the rotor is determined at rest or at a slow speed of rotation.

13. A brushless direct current motor comprising:
a stator carrying a plurality of armature coils forming a three-phase current winding for generating a rotating field turning on the stator, and having three terminals;
a rotor, which is rotatable about an axis of rotation relative to the stator, and has at least two opposing permanent magnet poles; and
a control device for the energization of the armature coils to generate the rotating field,
wherein the control device is configured, for the determination of the position of the rotor relative to the stator:
to apply at least one measurement voltage signal between a first and second of the terminals, wherein the applying includes connecting a supply voltage potential to the first terminal and a ground potential to the second terminal, or connecting a supply voltage potential to the second terminal and a ground potential to the first terminal, wherein the measurement voltage signal is comprised of at least one measuring pulse different than an electrical energization signal to be applied to the plurality of armature coils for generating a rotational field to drive the rotor,
to measure a resulting voltage on a third of the terminals, wherein the third terminal, for the measuring, is switched to a high-impedance state,
to determine, from a variation of the resulting voltage over time within a time interval, a gradient value which indicates the gradient of the resulting voltage in said time interval from the progression over time of the resulting voltage, and
to use the gradient value for determining the position of the rotor.

* * * * *

UNITED STATES PATENT AND TRADEMARK OFFICE
CERTIFICATE OF CORRECTION

PATENT NO. : 10,396,692 B2
APPLICATION NO. : 15/544237
DATED : August 27, 2019
INVENTOR(S) : Daniel Schikorra Page 1 of 1

It is certified that error appears in the above-identified patent and that said Letters Patent is hereby corrected as shown below:

In the Claims
Column 15, Line 60, Claim 1      Delete "the rotating rotational",
                                 Insert -- the rotational --

Signed and Sealed this
Seventh Day of July, 2020

Andrei Iancu
*Director of the United States Patent and Trademark Office*